Dec. 1, 1959  W. J. POPOWSKY  2,915,689
OSCILLATOR TRANSDUCER MOTOR CONTROL
Filed Aug. 17, 1955  3 Sheets-Sheet 1
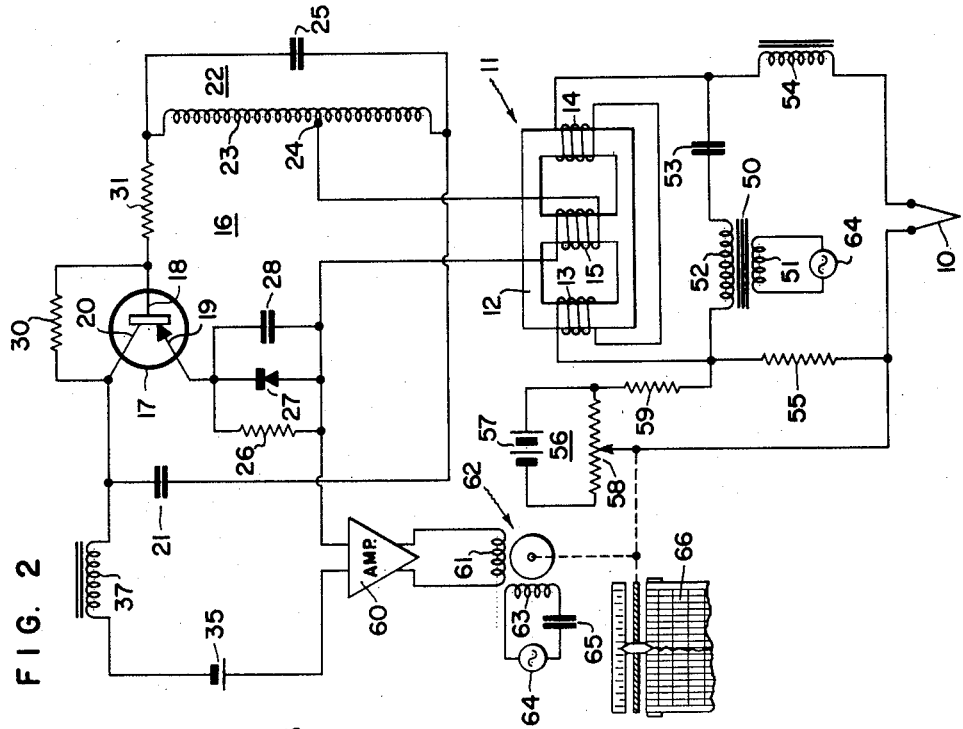
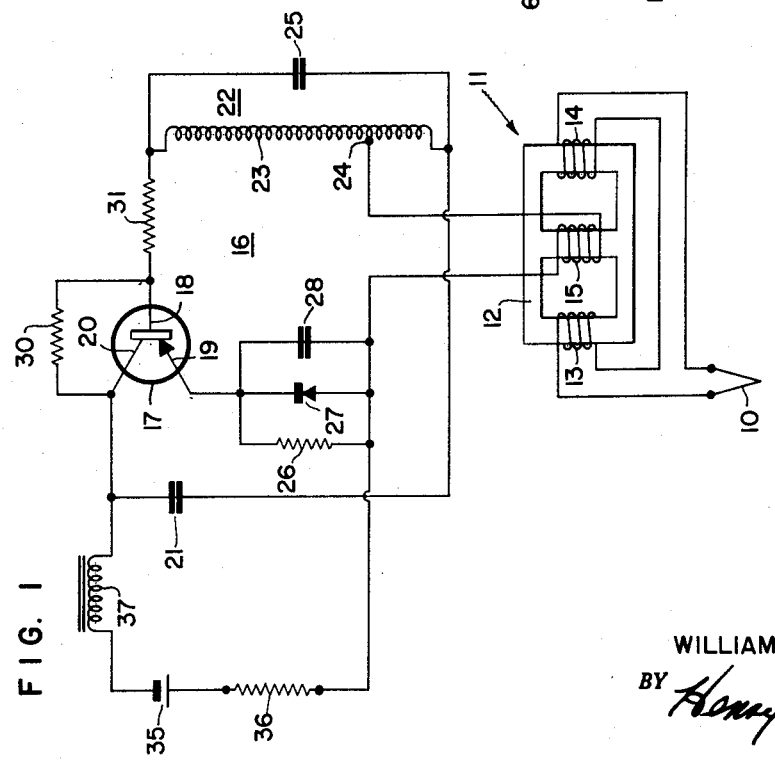
INVENTOR.
WILLIAM J. POPOWSKY
BY Henry L. Hanson
ATTORNEY.

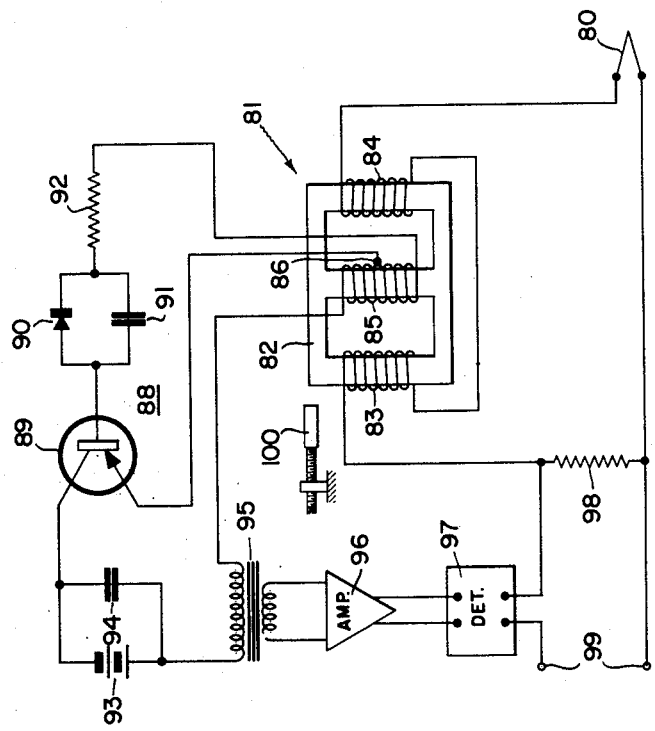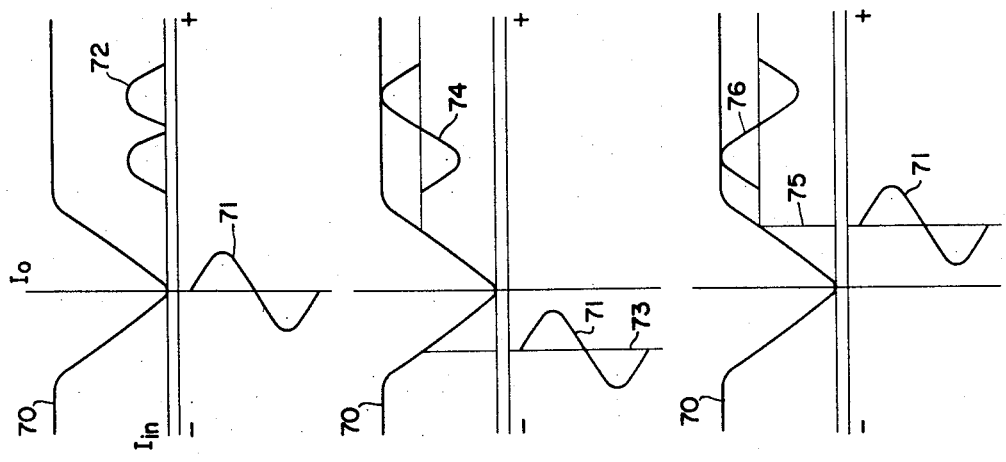

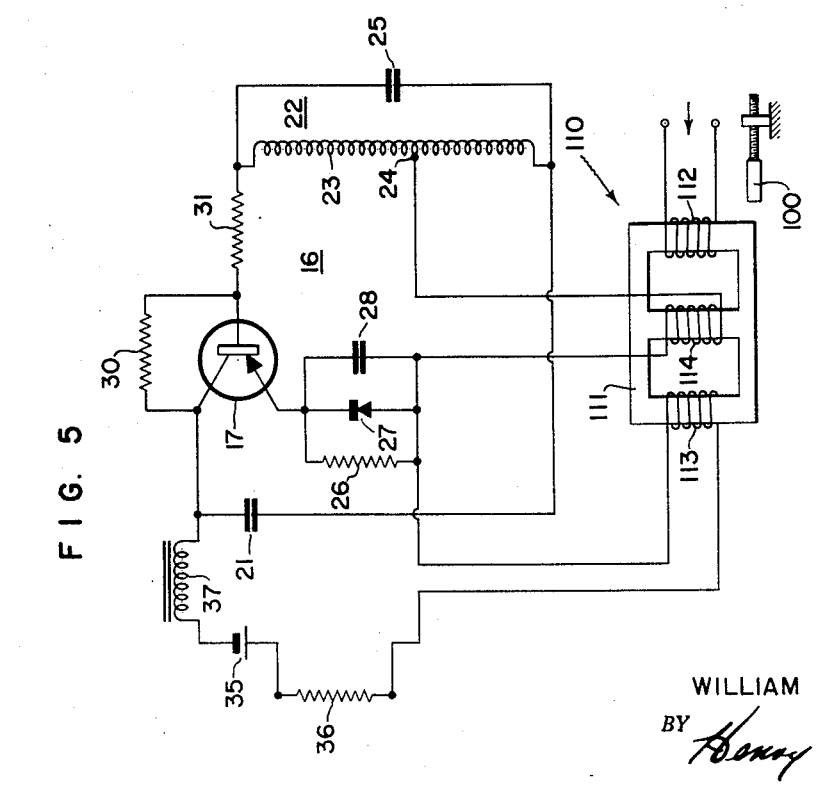

United States Patent Office 2,915,689
Patented Dec. 1, 1959

2,915,689

OSCILLATOR TRANSDUCER MOTOR CONTROL

William J. Popowsky, Philadelphia, Pa., assignor to Minneapolis-Honeywell Regulator Company, Minneapolis, Minn., a corporation of Delaware Application August 17, 1955, Serial No. 528,965

8 Claims. (Cl. 318—29)

The present application is a continuation in part of my copending application Serial No. 442,264, filed July 9, 1954, now Patent No. 2,847,625 and entitled "Electrical Control Apparatus."

A general object of the present invention is to provide a new and improved electrical transducer for translating an electrical input signal into a signal of amplified and/or modified form. More specifically, the invention is concerned with the provision of an electrical oscillator circuit which utilizes as an oscillation regulating impedance a saturable reactor the input signal to which is to be amplified by the transducer.

In accordance with the principles of the present invention, there is provided an electrical oscillator circuit of the type which is adapted for use in a transducer configuration in which oscillation intensity variations may be used in produce corresponding current variations in the supply circuit for the oscillator circuit. The oscillation intensity is controllable by means of a saturable impedance which regulates the magnitude of the regenerative feedback in the oscillator circuit. The regenerative feedback circuit is adjusted in the present form of the invention by means of a regulating impedance which is regulable in accordance with the magnitude of an applied electrical signal. As electrical current variations are preferred in the output circuit, it has been found that a transistor oscillator circuit configuration is particularly ideal for this type of use.

It is accordingly a further more specific object of the present invention to provide an improved oscillator circuit the intensity of oscillation of which and thereby the output current is regulable in accordance with the degree of saturation of an electrical impedance element connected in the regenerative feedback circuit of the oscillator circuit.

In the basic form of the present invention, the transducer is particularly adapted for use with a remotely located power supply with a two wire supply and signal transmission line required. Thus, the transducer may be located at a remote point and readily supplied with power from a single power line and the output signal from the transducer may be derived from the same power line. Such a configuration is useful in relaying electrical signals in a telemetering system.

In another form of the invention, it has been possible to achieve a signal modification by means of modulating the bias signals applied to the oscillator feedback regulating element. When so modulated, the output of the oscillator circuit may be used to drive a reversible servo motor or other phase sensitive means. The motor, or phase sensitive means, may be utilized for indicating and control purposes and also for producing a signal which may be fed back to the input to balance the control signal on the oscillator regulating impedance.

Accordingly, another object of the present invention is to provide an electrical oscillator utilizing a saturable impedance as a regulating element for regulating the intensity of oscillations of an oscillator circuit wherein the saturable impedance has applied thereto a modulating bias signal.

Still another object of the present invention is to provide an electrical oscillator circuit of the signal conversion type wherein the oscillator circuit is regulated by a saturable impedance modulated by a square wave modulating signal to minimize harmonic signals in the output under conditions of zero input signal.

A further object of the present invention is to provide an improved electrical oscillator circuit whose oscillation intensity is adapted to be regulated by a saturable impedance which has a permanent magnet acting as a means for biasing the same to establish a predetermined level of oscillation intensity in the oscillator circuit.

The various features of novelty which characterize the invention are pointed out with particularity in the claims annexed to and forming a part of this specification. For a better understanding of the invention, its advantages, and specific objects attained with its use, reference should be had to the accompanying drawings and descriptive matter in which there is illustrated and described preferred embodiments of the invention.

Of the drawings:

Fig. 1 shows the basic form of electrical signal transducer of the present invention;

Fig. 2 shows a modified form of the apparatus wherein a modulating signal is applied to the oscillation intensity regulating impedance;

Fig. 3 shows wave forms useful to the understanding of the operation of Fig. 2;

Fig. 4 shows a further modified form of the present invention incorporating electrical feedback and a permanent magnetic bias;

Fig. 5 shows the present invention modified for use as a repeater circuit;

Fig. 6 shows a modification of the circuit of Fig. 2 wherein a square wave generator is incorporated with the oscillation intensity regulating impedance; and Fig. 7 shows wave forms associated with the circuit used in Fig. 6.

*Figure 1*

Referring first to Fig. 1, the numeral 10 represents an electrical input producing device such as a thermocouple which produces an electrical output signal which is to be amplified. The thermocouple 10 is connected in impedance controlling relation to a saturable impedance element 11. The impedance element 11 comprises a saturable core 12 on which are wound a pair of input coils 13 and 14, the latter of which are connected to be energized by the signal from the thermocouple 10. Also wound on the saturable core 12 is an output coil 15, the impedance of which is used to regulate the intensity of oscillations of an oscilaltor circuit 16.

The oscillator circuit 16 comprises a transistor 17 having a base electrode 18, an emitter electrode 19, and a collector electrode 20. The transistor 17 is arranged to supply signal gain to the circuit so that it is possible to have oscillations in the circuit. The regenerative portion of the circuit includes a feedback condenser 21 and a resonant tank circuit 22, the latter of which includes an inductance element 23 tapped at 24 and a condenser 25 connected in parallel with the element 23.

Connected to the emitter 19 are suitable biasing elements including a resistor 26, a diode 27, and a condenser 28, the latter of which serves as an alternating current signal bypass for the biasing elements 26 and 27. Connected in shunt between the collector electrode 20 and the base electrode 18 is a resistor 30. In series with the base 18 is a further resistor 31. The resistors 30 and 31 are used to establish oscillation initiating bias signals for the transistor 17 so that the circuit may be brought into oscillation under widely varying temperature conditions.

Supplying power to the oscillator circuit 16 is a direct current power source shown in the form of a battery 35. Connected in series with the battery 35 is a resistance element 36. This resistance element may constitute the input impedance of a load device which is being energized by the transducer of the present invention. The load device may well take the form of an indicator and/or controller mechanism of any suitable type. Also in series with the battery 35 is a choke 37 which is useful in isolating the alternating current signals of the oscillator 16 from the load circuit as represented by the load impedance 36.

In considering the operation of Fig. 1, the oscillation circuit is first considered. The alternating current of the oscillator circuit including the transistor 17 may be traced from the collector electrode 20 through condenser 21, inductance element 23, tap 24, coil 15, and condenser 28 to the emitter electrode 19. The regenerative feedback signal to the base electrode 18 is produced by the upper portion of the coil 23 which is coupled to the base electrode 18 by the resistor 31.

The direct current supply circuit for the transistor 17 may be traced from the lower terminal of the battery 35 through load impedance 36, resistor 26 and diode 27 in parallel, emitter 19, collector electrode 20, and choke coil 37 back to the upper terminal of the battery 35. In addition, there is a direct current circuit around the transistor 15 which may be traced from the lower terminal of the battery 35 through impedance 36, coil 15, the upper portion of coil 23, resistor 31, resistor 30, and choke 37 back to the upper terminal of the battery 35. The impedance of this last traced circuit is sufficiently high compared to that of the circuit through the transistor that the current flow therethrough may be neglected for all practical purposes. There is a still further direct current circuit from the source 35 which flows through the emitter 19 and the base 18 with this current flow likewise being small compared to the total current flowing in the emitter and collector circuit.

The intensity of the oscillations of the oscillator will be directly dependent upon the magnitude of the impedance element 11, the latter regulating the amount of feedback in the oscillator circuit 16. When there is no direct current signal applied to the coils 13 and 14 from the thermocouple 10, the impedance of the impedance element 11 is high so as to reduce the regenerative effect of the oscillator circuit. This will mean that the intensity of oscillations will be less and there will be a resultant decrease in the current flowing in the emitter-collector path of the transistor 17 and through the load impedance 36. Thus, with a minimum or zero input signal, there will be a minimum direct current output signal flowing through the load impedance 36.

When a direct current signal is applied to the windings 13 and 14, the core material 12 will begin to saturate with the degree of saturation being dependent upon the magnitude of the input signal. As the saturation increases, the impedance of the element 11 will decrease.

With a decrease in the magnitude of the impedance of element 11, there will be an increase in the amount of regenerative feedback in the oscillator circuit 16 so that the intensity of the oscillations will be greater. This will result in there being a higher direct current signal flowing between the emitter 19 and the collector 20 and thereby through the load impedance 36. The increase in the current flowing through the load impedance 36 will be proportional to the increase in the signal applied by thermocouple 10.

It will thus be seen that there is produced a direct current output signal which is proportional to the signal produced by the thermocouple 10. This signal may be useful in indicating and/or controlling the condition which is detected by the thermocouple 10.

*Figure 2*

The apparatus of Fig. 2 utilizes the basic transistor oscillator transducer circuitry as used in Fig. 1 and consequently, corresponding components carry corresponding reference characters. Added to the circuit of Fig. 1 is a means for modulating the signal on the input of the saturable impedance 11 as well as means for responding to the modulating signal on the output of the transducer circuitry.

For modulating the direct current signal produced by the thermocouple 10, there is provided a transformer 50 having a primary winding 51 and a secondary winding 52. The secondary winding 52 is connected in series with a condenser 53 so that the signal may be applied directly to the coils 13 and 14. The windings 13 and 14 are arranged so that with an alternating current applied thereto, there will be no A.C. signal induced in the coil 15. This insures that the only variation in coil 15 will be due to flux variations in the core 12 and not due to the signal directly induced in coil 15. The direct current signal is also applied to the coils 13 and 14 and in this instance, it is necessary to isolate the thermocouple 10 from the alternating current input from the transformer 50 by means of a choke 54. Connected in series with the thermocouple 10 is a feedback resistor 55 which is adapted to have a feedback signal applied thereto by a potential produced in a feedback network 56. The network 56 includes a battery 57 and adjustable potentiometer 58. In series with the feedback voltage is a temperature compensating resistor 59, the latter of which may serve to compensate the circuit for ambient temperature changes in the cold junction of the thermocouple 10.

Connected to the output of the oscillator circuit 16 is an alternating current amplifier 60 which may be of any suitable type. The amplifier 60 supplies an alternating current signal to the control winding 61 of a two phase reversible motor 62. The motor 62 also has a line phase winding 63 which is adapted to be energized by a suitable alternating current source 64 which is the same source as supplies the energizing potential to the transformer 50 on the input. A phase shifting condenser 65 is connected in series with the line winding 63. The motor 62 is adapted to position the slider of the potentiometer 58 and also to position an indicating and recording mechanism 66.

In considering the operation of Fig. 2 it should first be noted that the oscillator circuit 15 functions in a manner corresponding to that of Fig. 1. Thus, its output current varies as an inverse function of the impedance of the saturable impedance 11 and in a direct function of the magnitude of the input signal.

The input and output characteristics of the circuit shown in Fig. 2 may be represented by the curves 70 shown in Fig. 3. These curves indicate that when there is a zero direct current input applied to the saturable impedance element 11, the output current $I_o$ will be at its minimum. As the input current increases either in a positive or a negative direction, the output current will increase in a positive direction. The output curves on either side of the zero input line are effectively mirror images of each other which enhances the operating characteristics of the apparatus. Referring more specifically now to Fig. 3A, this figure shows an alternating current modulating bias signal 71 being applied to the characteristics of the transducer circuit. This alternating current, in Fig. 2, is produced by the transformer 50 as it supplies a biasing signal to the windings 13 and 14 on the saturable core 12. Since, in Fig. 3A, there is no assumed direct current input signal, and the characteristic curve 70 is symmetrical, the signal 71 applied to the characteristic curve 70 will produce a second harmonic signal on the output and there will be no fundamental or odd harmonics present in the output. Thus, if 60 cycles is applied as a modulating signal from the transformer 50, the output signal from the circuit will be a 120 cycle signal as represented by the curve 72 in Fig. 3A. The second harmonic signal on the output of the circuit 16, when amplified by the amplifier 60, will not be effective to produce any rotation of the motor 62 and consequently the motor will remain in a stationary position.

If the bias on the saturable core 12 produced by the coils 13 and 14 should have a direct current component therein, the position about which the modulating signal will operate will shift in accordance with the magnitude of the direct current bias signal. Thus, referring to Fig. 3B, the modulating signal 71 is now shown operating about a line 73. This line 73 is representative of a negative input current signal as produced by the thermocouple 10. With the negative input signal and the modulating signal combined upon the characteristic curve of the transducer, the output signal of the transducer will be represented by the curve 74. The curve 74 will be of the same frequency as the modulating frequency. The signal will be amplified by the amplifier 60 and applied to the motor 62 to drive the motor, in a direction which is dependent upon the phasing of this curve 74 with respect to the signal from the source 64. The rotation of the motor 62 may be used to drive the potentiometer 58 and produce across the resistor 55 a potential which will balance the signal produced by the thermocouple 10 and thus move the biasing line back to the zero line as shown in Fig. 3A.

If the bias signal from the thermocouple 10 should be in a positive direction, the alternating current signal on the output of the transducer oscillator circuit 16 will be of a phase reversed from that discussed when the bias signal was negative. This is represented in Fig. 3C. Here, the modulating signal 71 is operating around a direct current bias level indicated by the line 75. The output alternating current signal from the transducer is represented by the curve 76 which is shown to be of a phase reversed from that of the output signal 74 shown in Fig. 3B. With the reverse signal on the output of the transducer circuit 16, there will be a reverse driving signal applied to the motor 62 which will reposition the potentiometer 50 in a balancing direction so that the direct current biasing level for the saturable reactor core 12 will shift back to the zero level as represented by Fig. 3A.

The circuit of Fig. 2 will thus be seen to show the adaptability of the present invention to a circuit configuration of the self balancing potentiometric type. This configuration is particularly adapted for use where high sensitivity and gain are required without any loss in overall operating characteristics.

Figure 4

The circuit of Fig. 4 involves a modified form of electrical transducer circuit wherein the saturable impedance has been shifted in the electrical circuit and the biasing circuits for the transistor have been modified. In this circuit, a thermocouple 80 is connected to supply a direct current biasing signal to the saturable impedance 81. The impedance 81 comprises a saturable core 82 having wound thereon a pair of input coils 83 and 84 and an output coil 85 which it tapped at 86. The saturable impedance 81 is connected to regulate the oscillation intensity in the oscillator transducer circuit 88. This latter circuit comprises a transistor 89 having the usual base, emitter, and collector electrodes. Connected in the base circuit of the transistor 89 is a diode 90 and a condenser 91 as well as a biasing resistor 92. Power is supplied to the transistor 89 by way of a battery 93. The output of the transducer circuit 88 is by way of the transformer 85 which is arranged to feed a further amplifier stage 96. The output of the amplifier 96 is connected to a suitable detector 97 to produce on the output a direct current signal proportional to the input. A feedback resistor 98 is connected in series with the thermocouple 80 and in series with a pair of output terminals 99, the latter of which may be connected to any suitable indicating and/or controlling instrument. A magnetic bias is supplied to the core 82 by a permanent magnet 100.

In considering the operation of Fig. 4, the oscillator circuit 88 will normally be in an oscillating state with the diode 90 acting to enhance the oscillation initiating ability of the circuit by appearing as a high impedance under conditions of no oscillation. Once the circuit is in oscillation, the oscillating signals will be bypassed around the diode 90 by the condenser 91. The alternating current output circuit for the transistor 89 may be traced from the collector of the transistor through the battery 93, transformer 95, coil 85 to tap 86, and back to the emitter of the transistor 89. The regenerative feedback signal is taken between the tap 86 and the lower terminal of the coil 85 through resistor 92 and condenser 91 to the base of the transistor 89. The oscillation intensity will be regulated by the impedance of the coil 85 which is wound upon the core 82. As the direct current biasing signal on the windings 83 and 84 tends to increase the saturation in the core 82, the impedance of the coil 85 will decrease and there will be a resultant decrease in the intensity of the oscillations of the oscillator circuit 88. The decreased intensity signal will be amplified by the amplifier 96 and rectified by the detector 97 to produce in the output circuit a direct current signal of lesser magnitude. The decreased magnitude direct current signal will flow through the feedback resistor 98 to balance the circuit.

In order to adjust the signal level in the output with respect to the input and to make the circuit polarity sensitive, the permanent magnet 100 may be used to vary the degree of saturation in the core 82. When the magnet 100 is moved closer to the core 82, the impedance of the coil 85 will be lower and there will be a smaller signal drop across the coil 85. This will be accompanied by a lower voltage appearing upon the base electrode of the transistor 89 to decrease the intensity of the oscillations. If the permanent magnet 100 is moved in the opposite direction, the degree of saturation in the core 82 will be decreased and there will be a consequent increase in the output current of the circuit 88. Thus, with the permanent magnet, the circuit may be made to operate on one half of the input-output characteristic which is of the general form of the curve 70 shown in Fig. 3.

Figure 5

The circuit shown in Fig. 5 is based upon the circuit shown in Fig. 1 with the exception that the circuit has been modified specifically for use as a repeater whereby a direct current input signal will be repeated on the output of the circuit in the normal manner of repeater circuits. In this figure, components corresponding to those of Fig. 1 carry corresponding reference characters.

Modified in this figure is the oscillation intensity regulating impedance which is now identified by the numeral 110. This impedance now comprises a saturable core 111 upon which is wound an input coil 112, feedback coil 113 and an output coil 114, the latter of which has its impedance varied and reflected into the oscillator transducer circuitry 16.

The operation of Fig. 5 is basically the same as the operation of Fig. 1 with the exception that the circuit is arranged as a null balance circuit in a repeater configuration. Thus, with an input signal being applied to input coil 112, there will be produced in the core 111 a degree of saturation which will cause the impedance of the coil 114 to decrease. The decrease of the impedance of the coil 114 will result in oscillations of higher intensity being produced in the oscillator transducer circuitry 16. With an increase in the intensity of the oscillations, there will be an accompanying increase in the output current flowing from the oscillator and through the feedback coil 113. This increased current flow in the coil 113 will tend to balance the flux condition in the core 111 produced by the coil 112. Thus, the output current flowing through the load impedance 36 will be a direct function of the input current supplied to the coil 112. In order to make this circuit polarity sensitive, the permanaent magnet 100 may be added to effect a fixed bias on the core 111, as in Fig. 4.

One of the particular advantages of the circuitry of Fig. 5 lies in its adaptability to the isolation of the power supply for the repeater section from the circuit proper. Thus, the battery 35 may be connected out at the position of the load impedance 36 at a considerable distance from the circuit 16 so that a self enclosed repeater station may be conveniently operated directly from the lines over which the signal is being transmitted.

Figure 6

The circuitry of Fig. 6 is a modification of the circuit shown in Fig. 2. In the present figure, the oscillation intensity regulating means 11 has been modified so that a square wave signal is applied thereto by the input coils 120 and 121 which are wound upon the core 122. The direct current input in this form of apparatus is applied by way of coils 123 and 124. The signal applied to the windings 120 and 121 is produced by a suitable square wave generator 125.

In the consideration of the operation of Fig. 2, the characteristic curves shown in Fig. 3 are somewhat idealized in that the characteristic around the zero input current line is actually somewhat flattened from that shown in Fig. 3 and more narrowly approaches the characteristic shown in Fig. 7. As shown in Fig. 7, the oscillator transducer characteristic curve is represented by the curve 130 and is shown to have a relatively wide and flattened characteristic about the zero input line 131. By utilizing a modulating signal on the core material 122 which is a square wave, whose magnitude does not extend beyond the flattened portions of the characteristic curve 130, it is possible to achieve an output signal which is substantially free from the second harmonic signal under zero direct current signal. Thus, in Fig. 7, with a square wave input as represented by the signal 132 which is operating about the zero line 131, there will be produced in the output a signal as represented by the curve 133. This curve represents a considerable reduction in the second harmonic component that is obtained with the circuit shown in Fig. 2 and as represented by the Fig. 3A curve 72.

If the direct current bias signal should shift to the left, or in a negative direction, there will be produced in the output a fundamental modulation frequency signal 136 corresponding to the frequency of the signal 132A. The signal 136 may be further amplified and used in a manner corresponding to that shown for Fig. 2.

If the signal bias level should shift to the right, or in a positive direction, to a level as represented by the line 137, the position of the modulating square wave 132B, there will be produced on the output a signal represented by the curve 139. This signal will be of a phase which is reversed from the phase of curve 136 indicating a reversal in the polarity of the direct current biasing signal on the saturating core of the impedance 11.

Summary

It will be readily apparent that each of the foregoing embodiments of the present invention incorporate new and novel circuitry wherein it is possible to regulate the oscillatory conditions of an oscillator by means of a saturable impedance. It will further be apparent that this basic oscillator transducer circuitry is adapted for use in numerous circuit configurations including straight amplification, potentiometric circuitry, telemetering, and numerous others which will be readily apparent to those skilled in the art.

While, in accordance with the provisions of the statutes, there have been illustrated and described the best forms of the embodiments of the invention known, it will be apparent to those skilled in the art that changes may be made in the forms of the apparatus without departing from the spirit of the invention as set forth in the appended claims and that in some cases certain features of the invention may be used to advantage without a corresponding use of other features.

Having now described the invention, what is claimed as new and for which it is desired to secure by Letters Patent is:

1. An electrical transducer comprising an electrical oscillator having a regenerative oscillation sustaining feedback circuit, a saturable inductance connected in said regenerative feedback circuit for regulating the oscillation intensity of said oscillating circuit, a pair of signal sources for biasing said saturable impedance, one of said biasing circuits being a direct current signal source and the other being an alternating current signal source, alternating current responsive means connected in the output of said oscillator circuit, and means including said oscillator circuit for producing in said alternating current responsive means a signal indicative of the magnitude and polarity of said direct current signal source.

2. Apparatus as defined in claim 1 wherein said alternating current responsive means comprises a reversible motor having one winding energized by a signal source whose frequency corresponds to the frequency of said alternating current biasing source.

3. Apparatus as defined in claim 1 wherein said alternating current responsive means produces a direct current signal which is adapted to be applied to the input biasing circuit of said saturable impedance to balance the input signal from said direct current biasing source.

4. An electrical signal transducer comprising an electrical oscillator having a regenerative oscillation sustaining circuit, a saturable impedance connected in said regenerative circuit and adapted when varied to produce variations in the oscillation intensity of said oscillator circuit, a direct current input circuit connected to said saturable impedance adapted to vary the impedance thereof in said oscillator circuit, an alternating current input circuit connected to said saturable impedance to vary the impedance thereof, and an output circuit for said oscillator circuit, said output having an alternating current signal thereon proportional to the magnitude of the input direct current signal and of a phase which is dependent upon the polarity of the direct current input signal.

5. Apparatus as defined in claim 4 wherein said alternating input signal to said saturable impedance is a square wave.

6. An electrical signal transducer comprising an oscillator having a regenerative oscillation sustaining circuit, a saturable impedance connected to said circuit to regulate the oscillation intensity in said circuit, said saturable impedance having an input winding means adapted for connection to a source of direct current signal which is to be amplified and effecting an output current variation in the output of said oscillator which is of the same magnitude and sense regardless of the polarity of the input of said direct current signal for the same magnitude of input signal, and an alternating current modulating signal source connected to said saturable impedance to produce in the output of said oscillator a second harmonic of the modulation frequency when there is no input direct current signal and an output signal of a first or second phase of the fundamental which are 180° displaced dependent upon whether the input direct current signal is positive or negative.

7. A transducer as defined in claim 6 wherein said modulating signal source comprises a square wave producing means.

8. A transducer as defined in claim 6 wherein said saturable impedance comprises a core having two input windings and an output winding with said input windings being wound on said core so as to induce no alternating current in said output winding.

References Cited in the file of this patent

UNITED STATES PATENTS

| | | |
|---|---|---|
| 2,381,057 | Hutcheson | Aug. 7, 1945 |
| 2,730,697 | Wermelskirchen | Jan. 10, 1956 |
| 2,770,734 | Reek | Nov. 13, 1956 |
| 2,793,291 | O'Connell et al. | May 21, 1957 |

OTHER REFERENCES

Transistor Circuit Design (Electronics Magazine), December 1951, pp. 128–132, 134.